United States Patent [19]

Taylor

[11] Patent Number: 4,762,278
[45] Date of Patent: Aug. 9, 1988

[54] COMBINATION LAWN MOWER WASHER AND SHARPENER

[76] Inventor: Conrad C. Taylor, 223-Sand Rd., Columbus, Miss. 39702

[21] Appl. No.: 116,493

[22] Filed: Nov. 4, 1987

[51] Int. Cl.$^4$ ............................................. B05B 15/08
[52] U.S. Cl. .................................... 239/281; 7/170; 51/98 BS; 51/241 S; 76/82.1; 239/289; 239/567; 239/DIG. 6
[58] Field of Search ........................ 239/289, 280-281, 239/567, DIG. 6; 51/98 BS, 241 S, 247; 7/170; 76/82.1

[56] References Cited

U.S. PATENT DOCUMENTS

| | | | |
|---|---|---|---|
| 3,225,527 | 12/1965 | Spear | 76/82.1 |
| 3,322,347 | 5/1967 | Pierce | 239/289 |
| 3,800,480 | 4/1974 | Keating | 76/82.1 |
| 4,265,146 | 5/1981 | Horrell | 51/92 BS |

*Primary Examiner*—Andres Kashnikow
*Assistant Examiner*—Michael J. Forman
*Attorney, Agent, or Firm*—H. Jay Spiegel

[57] ABSTRACT

The present invention relates to a device designed to be detachably attached to the undercarriage of a lawn mower through the use of hooks engageable with the blades of the lawn mower. The device includes an annulus having a plurality of holes therethrough with a coupling designed to be connectable to a water supply hose. Additionally, a pair of diametrically opposed sharpening stones are rotatably mounted on the device and are automatically rotated through the provision of paddlewheels, each of which is rotated through the provision of water sprayed thereon as supply from two supply conduits. When the hose connection is connected to a hose supplying water to the device and the water begins to flow, water sprays out the openings in the annulus to clean the undercarriage of the lawn mower while water spraying out the supply conduits impinges on the paddlewheels causing the grinding stones to rotate to thereby sharpen the lawn mower blades.

8 Claims, 1 Drawing Sheet

COMBINATION LAWN MOWER WASHER AND SHARPENER

BACKGROUND OF THE INVENTION

The present invention relates to a combination lawn mower washer and sharpener. In the prior art, water sprinkling devices and lawn mower blade sharpeners are well known. U.S. Pat. Nos. 515,625 to Stott and 871,029 to Buelna, et al are two examples of patents which teach sprinkling devices. Furthermore, U.S. Pat. No. 4,265,146 to Horrell discloses the concept of a portable sharpening device for use in sharpening the blades of a lawn mower. However, never before has there been invented a device which will simultaneously clean the undercarriage of a lawn mower while sharpening the blades thereof.

It is well known that in lawn mowers of the rotary plural blade type, after a lawn has been mowed, the undercarriage of the lawn mower and the blades thereof become covered with grass and other debris which, if left uncleaned, will result in loss in efficiency of the lawn mower. Thus, a need has developed for a device which will easily facilitate the cleaning of the undercarriage of a rotary lawn mower.

Along this line, several times a year, the lawn mower blades themselves must be sharpened. As such, it would be extremely convenient to provide an invention which could simultaneously clean the undercarriage of a lawn mower while sharpening the blades thereof. It is in light of this aspect that the present invention was developed.

SUMMARY OF THE INVENTION

The present invention overcomes the deficiencies found in prior art devices and provides a new and improved combination lawn mower washer and sharpener including the following interrelated aspects and features.:

(a) in a first aspect, the inventive combination lawn mower washer and sharpener includes a plurality of adjustable legs which support a frame structure carrying an annular tube having a plurality of openings therethrough with the tube being connectable to a source of water.

(b) the frame structure also rotatably supports a pair of grinding stones each of which has rigidly mounted thereto a paddlewheel which is mounted in alignment with a water tube designed to spray water thereon to cause the paddlewheel and the grinding stone to rotate.

Attached to the frame structure are a pair of hooks which are designed to be attachable over the blades of the lawn mower to thereby rigidly attach the device to the lawn mower in a manner aligning the annular tube with the undercarriage of the lawn mower while simultaneously aligning the grinding stones with the edges of the blades thereof which are to be sharpened through the use of the present invention.

(c) The conduits supplying pressurized water to turn the paddlewheels include adjustable valves to adjust water flow through the conduits and thus speed of rotation of the paddlewheels and grinding stones. Furthermore, the frame includes several adjustments enabling the device to be adaptable to lawn mowers having undercarriages and blades of differing sizes.

Accordingly, it is a first object of the present invention to provide an improved combination lawn mower washer and sharpening device.

It is a further object of the present invention to provide such a device including structure facilitating the cleaning of the undercarriage of a lawn mower while simultaneously sharpening the lawn mower blades.

It is yet a further object of the present invention to provide such a device including several adjustment features facilitating the adjustment of the device to accommodate lawn mowers of differing sizes and configurations.

These and other objects, aspects and features of the present invention will be better understood from the following detailed description of the preferred embodiments when read in conjunction with the appended drawing figures.

SPECIFIC DESCRIPTION OF THE PREFERRED EMBODIMENT

Figures 1, 2:
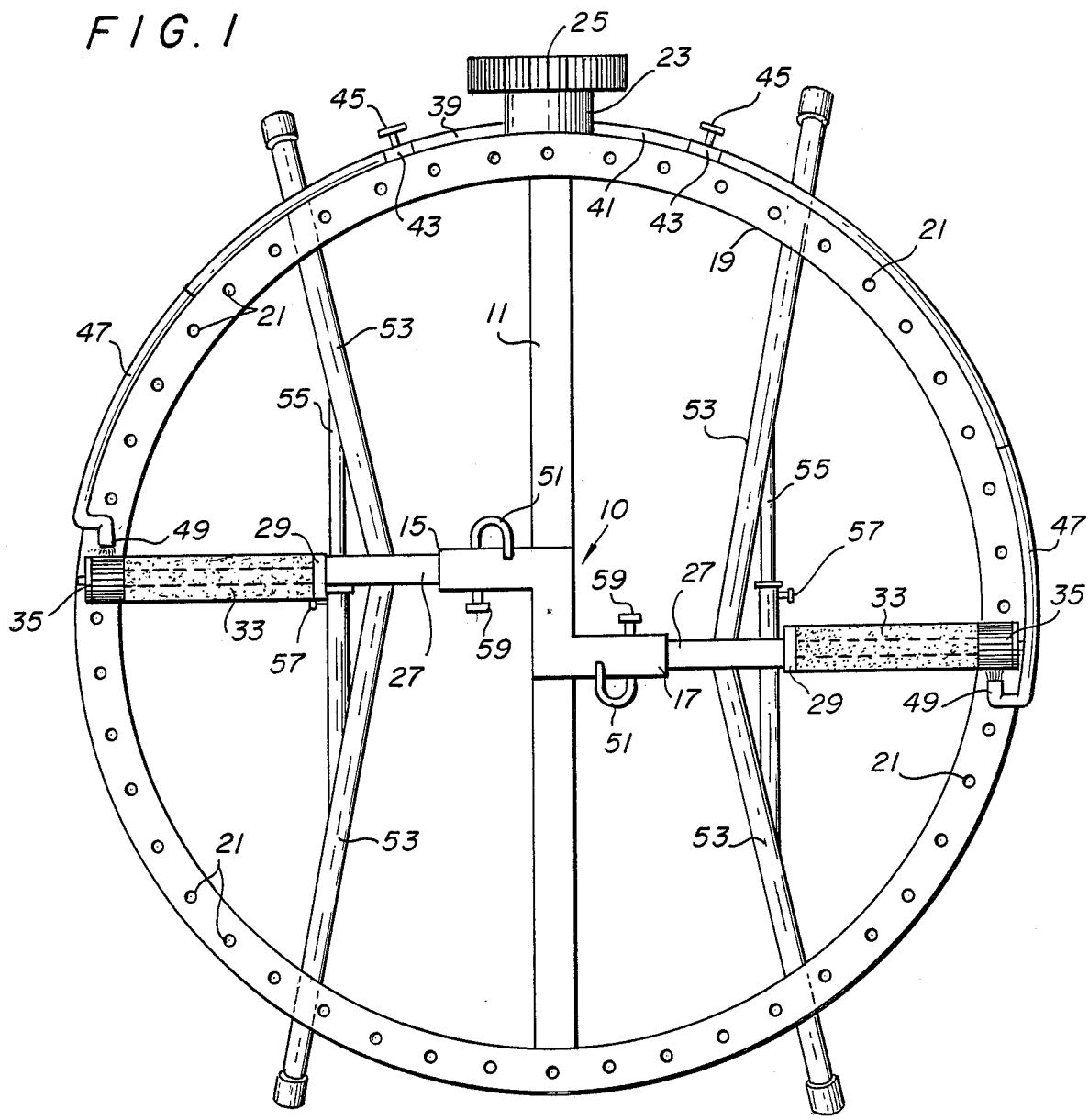
FIG. 1 shows a top view of the present invention.
FIG. 2 shows a perspective view of one of the grinding stones of the present invention.

With reference first to FIG. 1, it is seen that the invention generally designated by the reference numeral 1 includes a frame structure 10 including arms 11 and 13 which are axally aligned and with further spaced parallel arms 15 and 17.

The arms 11 and 13 each connect at their respective distal ends with an annular hollow tube 19 having a plurality of vertically exposed holes 21 therethrough. The tube 19 has a short conduit 23 connected thereto and in fluid connection with the interior of the tube 19 and has a coupling device 25 incorporated therewith which is designed to facilitate the coupling of the conduit 23 with a hose connector.

The arms 15 and 17 have hollow interiors and slidably receive sleeves 27 each of which has rigidly mounted thereto an enlarged portion 29 having mounted thereon an elongated rod 31.

Slidably mounted over each rod 31 is a cylindrical grinding stone 33 having a central passageway therethrough sized to closely fit over the rod 31. At the distal end of each grinding stone 33, a paddlewheel 35 is attached in a manner so that the paddlewheel 35 is constrained to rotate with the grinding stone 33. With reference to FIG. 2, it is seen that a snap ring 37 is provided on the end of each rod 31 so as to hold the paddlewheel-grinding stone combination in mounted assembly on the rod 31.

With reference back to FIG. 1, it is seen that a pair of supply conduits 39, 41 are fluidly connected to the conduit 23 and each supply conduit 39, 41 includes an in-line valve 43 with an actuator 45 allowing selection of the amount of flow which flows through the conduit 39 or 41. The conduits 39 and 41 each have open distal ends to which are connected flexible conduits 47 which may be made of a material such as copper which allows bending and adjustment. A seal (not shown) is mounted on the interface between the conduit 47 and the conduit 39 or 41 to prevent leakage from the sliding connection therebetween. Each conduit 47 includes an outlet 49 designed to allow the spraying of water on the surface of the paddlewheel 35 to rotate the paddlewheel-grinding stone combination at a speed which is determined by the adjusted flow rate through the valve 43.

The arms 15 and 17 each have mounted thereon a hook 51 which is designed to be detachably attachable to the blade of a rotary lawn mower. The hooks 51 are made of a flexible material so that they may be bent in any desired manner to allow adjustment of the device 1 on the lawn mower blades while allowing mounting and dismounting thereof.

Furthermore, attached to the frame 10 are a plurality of legs 53 in two pairs of opposed legs with each pair of legs being hingedly mounted to a respective sleeve 27 and being connected together by a telescoping connector 55 the extent of telescoping of which is controlled by the screw 57. Thus, when it is desired to adjust the height of the device 1 with respect to a ground surface, the screws 57 may be loosened whereupon the legs 53 may be pivoted about their respective sleeve 27 until the height of the device 1 with respect to the ground surface is at a desired level whereupon the screws 57 may be tightened to lock the vertical position of the device 1. In a similar matter, screws 59 are provided so that the sleeves 27 may be telescoped outwardly from the respective arms 15, 17 to a desired extent to adjust the outward position of the grinding stones 33 with respect to the blades of a particular lawn mower whereupon the screws 59 may be tightened to lock that position.

In the operation of the present invention, when it is desired to simultaneously clean and sharpen the blades of a lawn mower, the device 1 is placed on the ground and a water hose is coupled to the coupling 25. The legs 53 are adjusted through loosening of the nuts 57 and adjustment of the orientation of the legs 53 by pivoting about the sleeves 27 until the device 1 is at the desired height whereupon the nuts 57 are tightened to lock the height of the device 1. Then, the screws 59 are loosened and the sleeves 27 are extended or retracted to a position aligning the grinding stones 33 with the blades of the lawn mower which is to be sharpened.

Thereafter, the tubes 47 are bent due to their flexible nature until the ends 49 thereof are aligned with the respective paddlewheels 35. Finally, the device 1 is rigidly affixed to the lawn mower which is to be cleaned and sharpened by installing the hooks 51 over the blades thereof. This having been accomplished, flow of water through the water hose (not shown) and into the conduit 23 is commenced and the valves 45 are adjusted for the desired rotation speed of the grinding stones 33. As the grinding stones 33 rotate, water will simultaneously be sprayed out the openings 21 in the annulus 19 so that while the blades of the lawn mower are being sharpened, the undercarriage of the lawn mower is simultaneously being cleaned.

If it is desired to clean the undercarriage of the lawn mower without sharpening the blades thereof, the above procedures are followed but the valves 43 are maintained in closed position to prevent rotation of the grinding stones 33.

In the preferred embodiment of the present invention, the grinding stones are made of a hard material with a fine grain designed to facilitate smooth turning of the grinding stones 33. Furthermore, if desired, should it be found that in a particular circumstance the water pressure flowing out the tubes 47 is insufficient to rotate the grinding stones 33 with sufficient torque to facilitate sharpening, auxiliary rotating means such as electrical motors mounted to directly rotate the stones 33 or an electric fluid pump designed to pump water at a faster rate may be employed.

As such, the present invention overcomes all the disadvantages in the prior art as detailed above and provides an invention which fulfills each and every one of the objects as set forth hereinabove. Of course, various alterations, variations and modifications in the teachings of the present invention may be contemplated by those skilled in the art without departing from the intended spirit and scope thereof. Accordingly, it is intended that the present invention only be limited by the terms of the appended claims.

I claim:

1. A combination lawn mower washer and sharpener, comprising:
    (a) a frame including a plurality of legs;
    (b) a water supply coupling attached to said frame and including a single inlet and a plurality of outlets;
    (c) a first one of said outlets supplying first nozzle means for spraying an undercarriage of a lawn mower;
    (d) a grinding stone rotatably mounted on said frame and having means for rotating said grinding stone attached to said frame and said grinding stone;
    (e) said frame including means for attaching said frame to the undercarriage of said lawn mower with said grinding stone being aligned with a blade of said lawn mower;
    (f) whereby said grinding stone may be rotated by said means for rotating while said first nozzle means sprays water on the undercarriage of said lawn mower to remove debris therefrom.

2. The invention of claim 1 wherein said legs are adjustable to adjust the height of said frame.

3. The invention of claim 2, wherein said frame has mounted thereon a plurality of grinding stones each of which is rotated by water sprayed on a paddlewheel affixed thereto.

4. The invention of claim 3, further including valve means for controlling flow of water spraying on said paddlewheels to thereby control the speed of rotation of said grinding stones.

5. The invention of claim 1, wherein said means for rotating said grinding stone comprises a paddlewheel attached to said grinding stone, and a second one of said outlets includes second nozzle means adapted to spray water on said paddlewheel to rotate said grinding stone.

6. The invention of claim 1, wherein said grinding stone is mounted on said frame on a telescoping support enabling adjustment of the position of the grinding stone for different sized and configured lawn mowers.

7. The invention of claim 1, wherein said means for attaching comprises at least one hook adapted to releasably mount to said lawn mower blade.

8. The invention of claim 1, wherein said first nozzle means comprises an annulus having a plurality of circumferentially spaced holes therethrough, said annulus being hollow and being supplied with water from said water supply coupling.

* * * * *